US008755772B1

(12) United States Patent
Natsis

(10) Patent No.: US 8,755,772 B1
(45) Date of Patent: Jun. 17, 2014

(54) SMARTPHONE CONTACT DATA MANAGEMENT SYSTEM

(71) Applicant: Global Code Design LLC, Weehawken, NJ (US)

(72) Inventor: Pantelis Spylios Natsis, Weehawken, NJ (US)

(73) Assignee: Global Code Design LLC, Weehawken, NJ (US)

( * ) Notice: Subject to any disclaimer, the term of this patent is extended or adjusted under 35 U.S.C. 154(b) by 0 days.

(21) Appl. No.: 14/136,885

(22) Filed: Dec. 20, 2013

(51) Int. Cl.
*H04M 1/725* (2006.01)
*H04M 3/42* (2006.01)

(52) U.S. Cl.
USPC ...................... 455/412.1; 455/412.2; 455/415

(58) Field of Classification Search
USPC ....................................................... 455/412.1
See application file for complete search history.

(56) References Cited

U.S. PATENT DOCUMENTS

| 7,961,212 B2* | 6/2011 | Woodworth et al. ...... 348/14.01 |
| 2002/0090933 A1* | 7/2002 | Rouse et al. ................... 455/412 |
| 2004/0092250 A1* | 5/2004 | Valloppillil ................ 455/412.1 |

* cited by examiner

Primary Examiner — Huy C Ho
(74) Attorney, Agent, or Firm — Nilay J. Choksi; Smith & Hopen, P.A.

(57) ABSTRACT

A method, system, and apparatus for sharing contact information between a first mobile device (e.g. user-operated mobile device) and a second mobile device (e.g., third party-operated mobile device). A plurality of contacts are loaded by an end-user onto the first mobile device through an application installed on the first mobile device. The plurality of contacts can then be accessed on the second mobile device through the application installed on the second mobile device, when authenticated by the end-user. One or more contacts from the contact list can be provided a customizable notification originating from the second mobile device. One or more contacts from the contact list can also be shared with (i.e., downloaded to) the second mobile device. When the end-user terminates a session with the application on the second mobile device, the second mobile device no longer has access to the end user's plurality of contacts on the application.

15 Claims, 19 Drawing Sheets

Authorize the App from your Google Account, Facebook or Linked In Account and you are ready to go!

We'll only post with your permission.

We'll only post with your permission.

We'll only post with your permission.

Login Form

SMARTPHONE CONTACT DATA MANAGEMENT SYSTEM

BACKGROUND OF THE INVENTION

1. Field of the Invention

This invention relates, generally, to mobile applications. More specifically, it relates to an application or intermediary used to share a single contact list (and contacts therein) between a plurality of mobile devices.

2. Brief Description of the Prior Art

With the growing popularity of smartphones, tablets, and other mobile devices, the ability to have access to the information stored on such mobile devices is becoming increasingly important and needed by end-users. Backing up information onto external hard drives and cloud-based servers has become commonplace for end-users to secure or protect information contained on a mobile device in the event that that mobile device is stolen, malfunctions, or is otherwise compromised.

Traditionally, though, backed-up information can be loaded onto an electronic device, such that any user of that device can access that information. For example, if an end-user loses a mobile device, the end-user purchases a new mobile device and downloads the information that was backed up from the original mobile device. Any user of that new mobile device, however, can access that downloaded information.

More specifically, contacts and contact information are stored on a mobile device and are backed up regularly. Contact information is vital to a user's ability to contact other individuals, as users are becoming less likely to memorize contact information, such as phone numbers, when contact information is so readily accessible on the user's mobile device. If a user wishes to access the user's own contact list on another mobile device, the user could erase all contact information stored on the other mobile device and download the contact list from the backup server onto that other mobile device. However, one can see how this methodology would become problematic when that other mobile device belongs to a third party that is distinct from the user.

Currently, the conventional art fails to provide any manner of sharing contact lists between two (2) or more distinct mobile devices securely and effectively. If a user wishes to access the user's own contact list on a third party's mobile device (with authorization from the third party), that third party should also be prevented from accessing the user's contact list on the third party's mobile device without authorization from the user, but the conventional art fails to teach this aspect as well. In this case, only the user should be authorized to access the user's contact list on the third party's mobile device, but the conventional art has taught away from this methodology by extensively teaching methodologies that simply back up information onto external hard drives and cloud-based servers, as discussed previously.

Accordingly, what is needed is a secure method of sharing contacts between two (2) or more distinct mobile devices. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for securely sharing contact information among a plurality of mobile devices is now met by a new, useful, and nonobvious invention.

In an embodiment, the current invention is a system or computer-implemented/based method for sharing contact information between a first mobile device and a second mobile device. A downloadable software application is installed on a first mobile device, where the first mobile device has a contact database that is accessible by third party applications. A contact database access module provides read access to the contact database by the software application, whereby at least a portion of the contact database is extracted to a contact list. A unique user authentication profile is generated by the software application and is linked to the contact list extracted from the contact database. A synchronization module is provided and coupled to the software application, such that the synchronization module synchronizes the contact list to a remote storage archive. An authentication module is provided and communicatively coupled to the remote storage archive, such that the authentication module permits access to the contact list after the user authentication profile is accurately provided to the authentication module. The system/method further includes a second mobile device that has the software application installed on it. This software application is communicatively coupled to the telephony functions of the mobile device, whereby outbound telephone calls are initiated directly from the software application. A remote access module is also provided on the second mobile device, such that the remote access module sends the user authentication profile to the authentication module to access the contact list on the remote storage archive. A dialing module on the software application initiates an outbound telephone call to an individual contact in the contact list retrieved from the remote storage archive by the remote access module. The outbound telephone call is initiated from the second mobile device.

The remote storage archive may provide ephemeral, transitory storage of the contact information in the contact list for remote access by the remote access module on the second mobile device.

The system/method may further include a preemptive notification module on the second mobile device, where the preemptive notification module transmits a notification to a contact from the contact list.

The synchronizing module synchronizes the contact list and the user authentication profile to the remote storage archive, optionally responsive to a personal identification number being generated and linked to the contact list and to the user authentication profile.

The second mobile device may download a selected contact from the contact list on the remote storage archive. Further, the second mobile device can download this selected contact responsive to a personal identification number being generated and linked to the contact list and to the user authentication profile.

The system/method may further include a personal identification number generated and linked to the contact list and to the user authentication profile after the software application on the second mobile device receives the user authentication profile accessing the contact list on the remote storage archive.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 6 also can show a page for an end-user to enter a created personal identification number prior to downloading contacts to the end-user's mobile device, according to an embodiment of the current invention.

FIG. 18B is a step-by-step flowchart of a methodology of the current invention on a second (e.g., third party-operated) mobile device in relation to the methodology of the first mobile device of FIG. 18a.

DETAILED DESCRIPTION OF THE PREFERRED EMBODIMENT

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

In an embodiment, the current invention is an application or intermediary that facilitates a user accessing a contact list from a user-operated mobile device (e.g., smartphone) securely and remotely on a distinct or third party-operated mobile device (e.g., smartphone, tablet). The user-specific contact list and contacts therein are shared between the user-operated mobile device and the third party-operated mobile device through the intermediary.

Figure 18A:
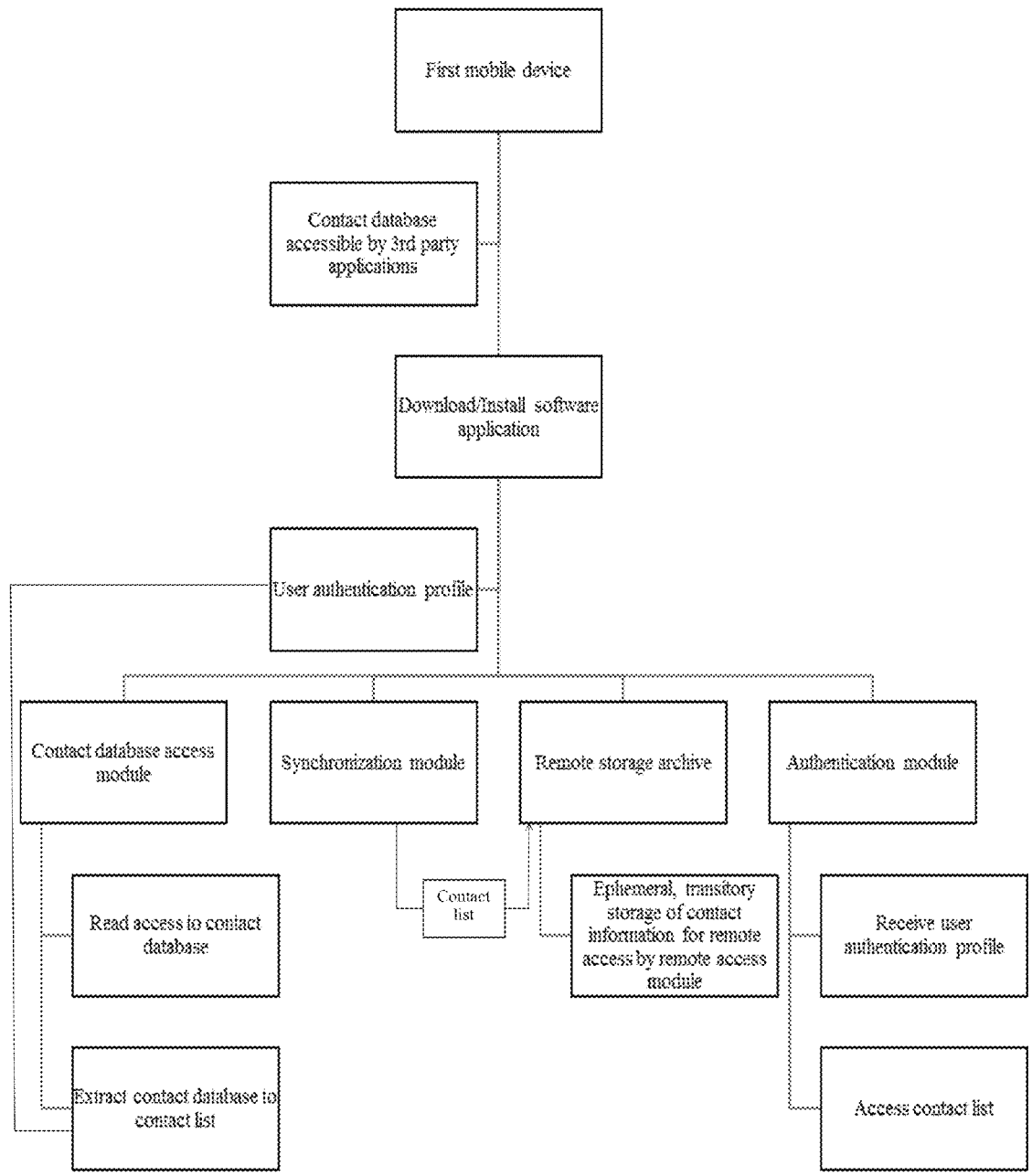
FIG. 18A is a step-by-step flowchart of a methodology of the current invention on a first (e.g., user-operated) mobile device.
Figure 18B:
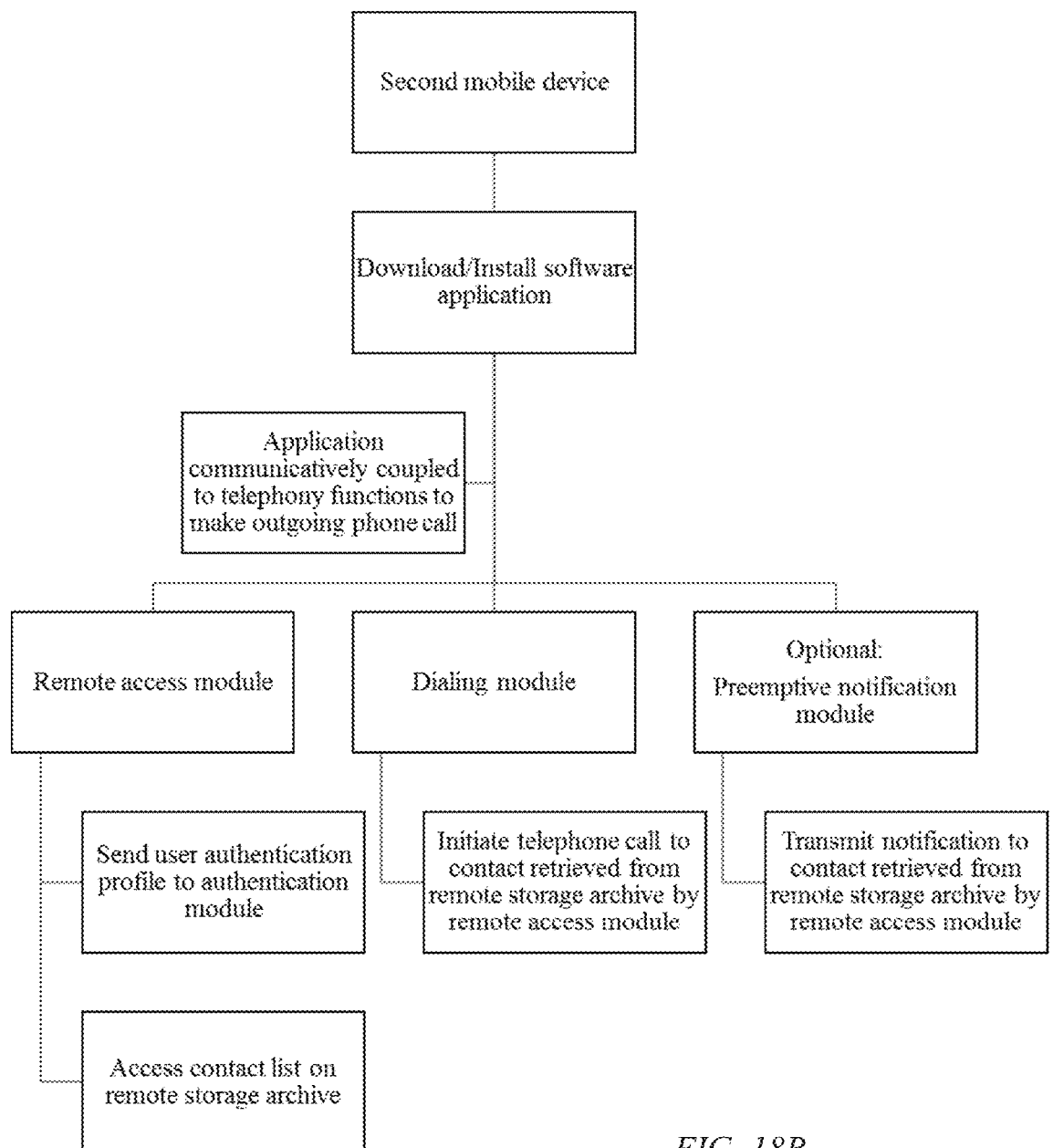

As seen in FIGS. 18A-18B, the novel system shares contact information between a first mobile device (e.g., user-operated mobile device) and a second mobile device (e.g., third party-operated mobile device). At least the first mobile device should allow third party applications to access the contact database on the device. Thus, after the software application is downloaded and installed onto the first mobile device, a contact database access module can provide the software application with read access to the contact database, so that the contact database can be extracted to a contact list. The user is then authenticated using an authentication profile generated by the software application, where the profile is linked with the contact list. A synchronization module is coupled to the software application so that the contact list can be synchronized with a remote archive storage. An authentication module is communicatively coupled to the remote storage archive to allow access to the contact list when the user is authenticated via the profile.

A second mobile device is provided with the software application downloaded and installed thereon. The application is communicatively coupled to the telephony functions of the device, so that telephone calls are initiated directly from the application. A remote access module on the device sends the user's authentication profile/information to the authentication module to access the contact list on the remote storage archive. A dialing module on the software application on the second device can then initiate an outbound telephone call to a contact retrieved from the contact list on remote storage archive by the remote access module.

The remote storage archive provides ephemeral, transitory storage of the contact information in the contact list, so that the remote access module can remotely access the information on the second device without having to download the information to the second device.

Figure 15:
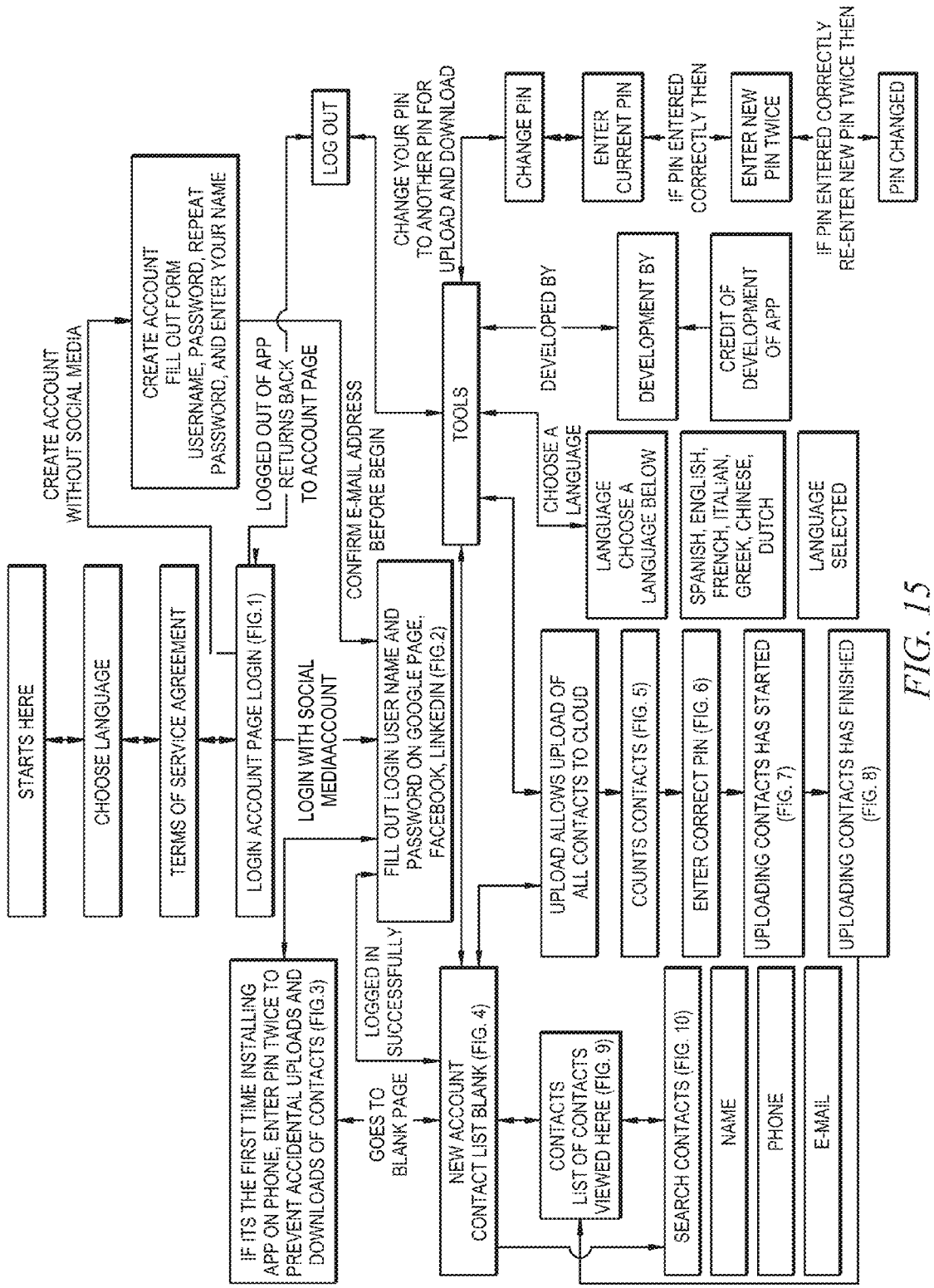
FIG. 15 is a step-by-step flowchart of an end-user's initial launch of a software application according to an embodiment of the current invention on a user-operated mobile device.

Initial Launch of Application on User-Operated Mobile Device (FIG. 15)

Figure 1:
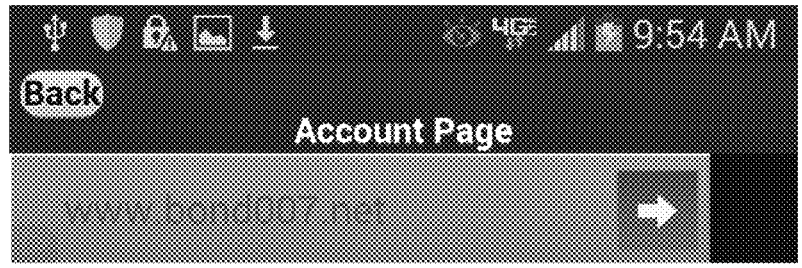
FIG. 1 is a screenshot of a login page authenticating an end-user for launching a software application according to an embodiment of the current invention.
Figure 1:
Figure 1:
Figure 1:
Figure 1:
Figure 1:
Figure 2:
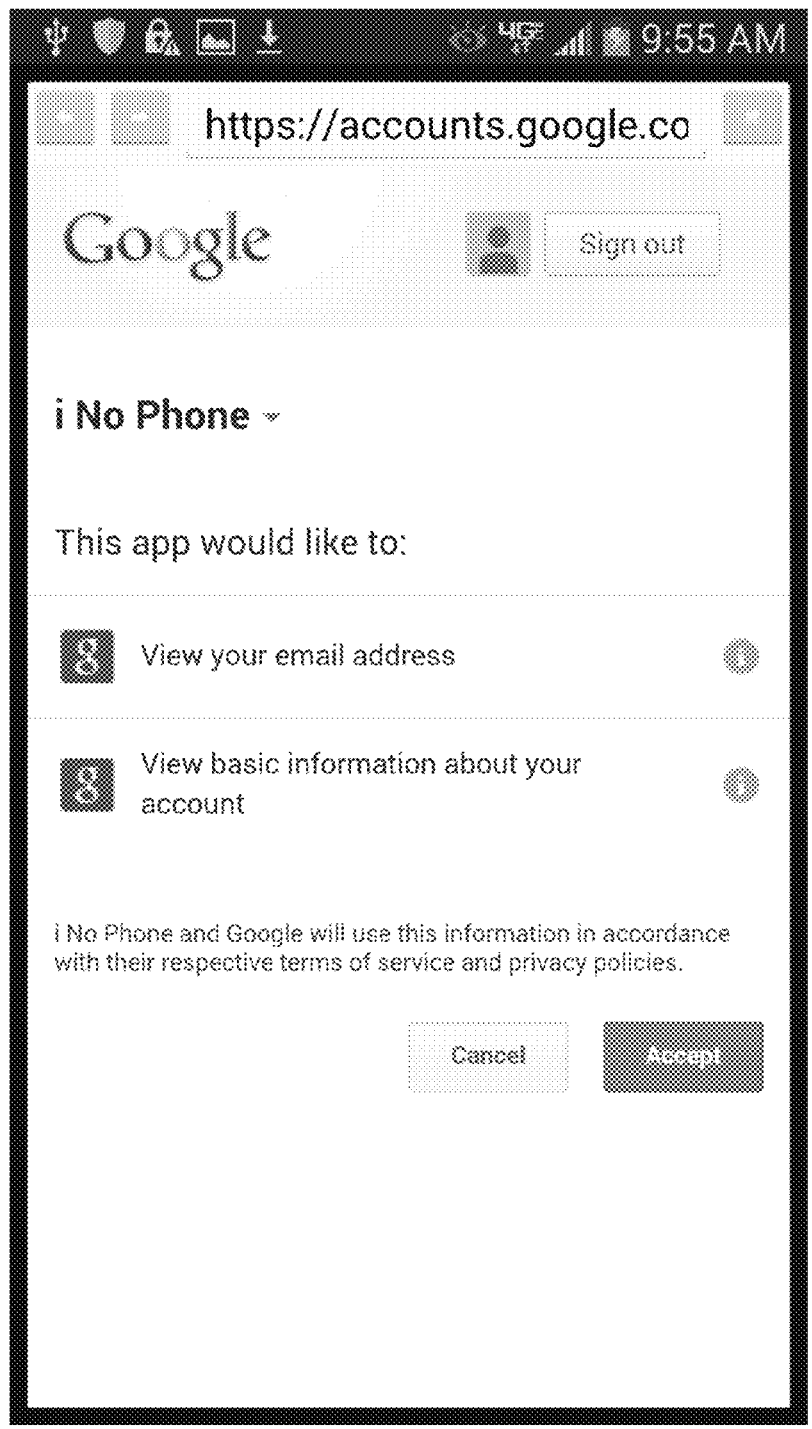
FIG. 2 is a screenshot of a login page using a social media account for launching a software application according to an embodiment of the current invention.

Upon downloading the application to the user-operated mobile device, an introductory page or splash screen would be displayed, followed by a language selection page and terms of services agreement. When the terms of services are accepted, a login page (similar to that seen in FIG. 1) is presented to the user, where the user can use a native application account (name, username, password, email address with account creation confirmation, etc.) or any social media account (e.g., FACEBOOK, LINKEDIN, GOOGLE (FIG. 2), etc.) to log into the application.

Figure 3:
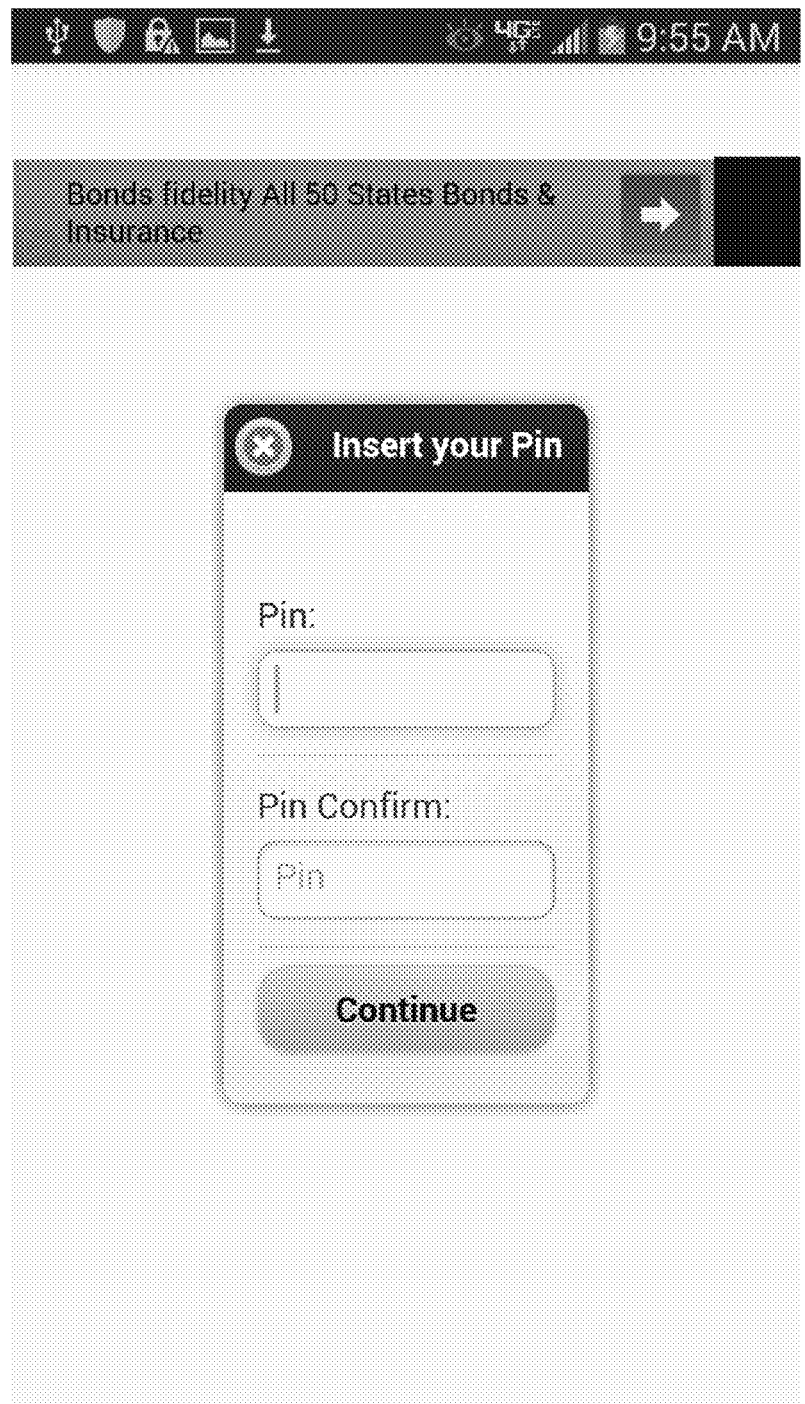
FIG. 3 is a screenshot of a page for an end-user creating a personal identification number in order to upload/download contacts to a software application according to an embodiment of the current invention.
Figure 4:
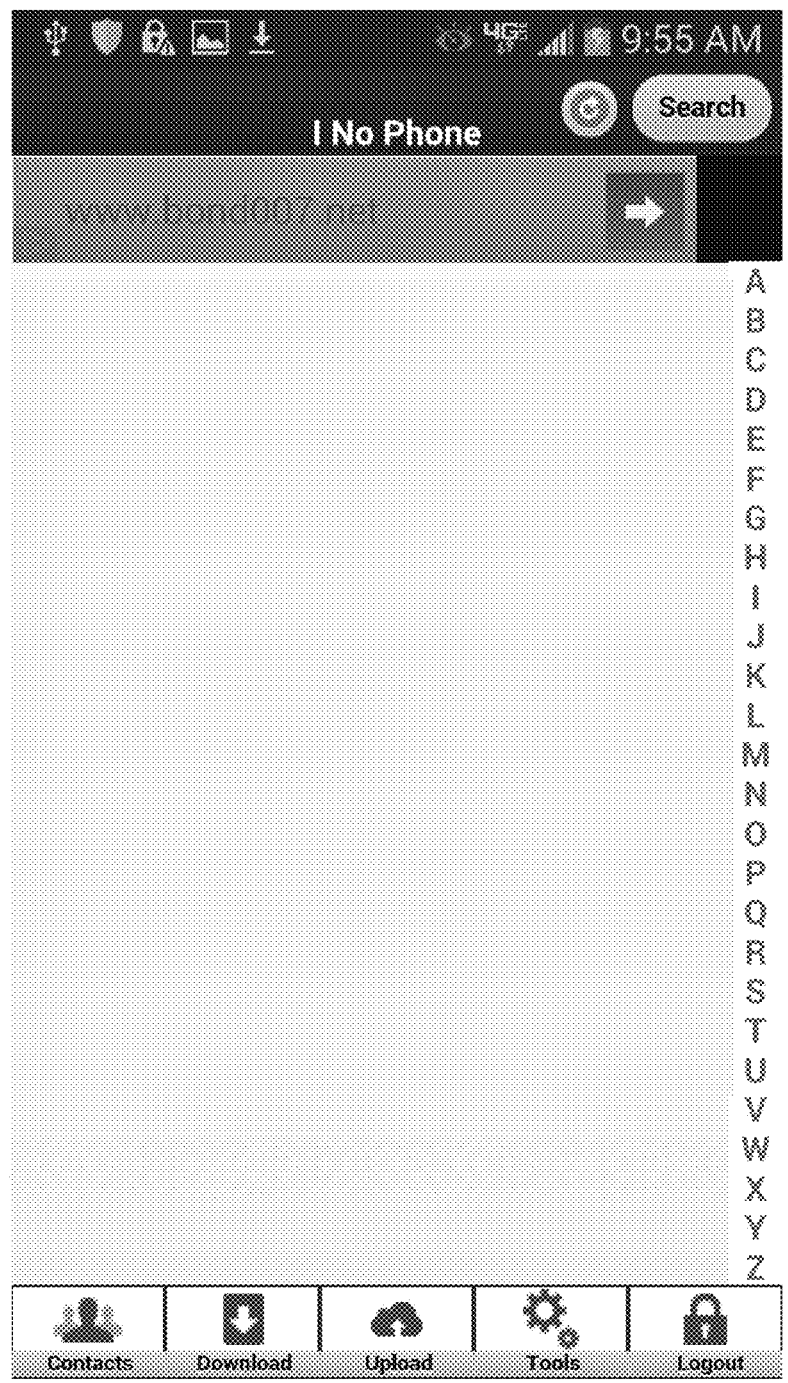
FIG. 4 is a screenshot of an initial contact list page that is blank prior to uploading contacts to a software application according to an embodiment of the current invention.

Because this is an initial launch of the application on the user-operated mobile device, the user would create and enter a personal identification number ("PIN") (FIG. 3) that can include any number of alphanumeric characters and special symbols. The PIN prevents accidental uploads and downloads of contact lists or any portion thereof. Upon creation of the PIN, a contact list appears, but with new accounts, such as described here, the contact list would be blank, as seen in FIG. 4.

In an embodiment, a PIN may not need to be created. Rather, the user is directed directly to the blank contact list page after initially logging into the application.

When the user initially launches the application and obtains a contact list display that is blank, the user can upload the user-specific contact list from the user-operated mobile device into the application. This uploaded user-specific contact list can be stored either on the application's servers or in the cloud where the application can access the contact list remotely.

Figure 5:
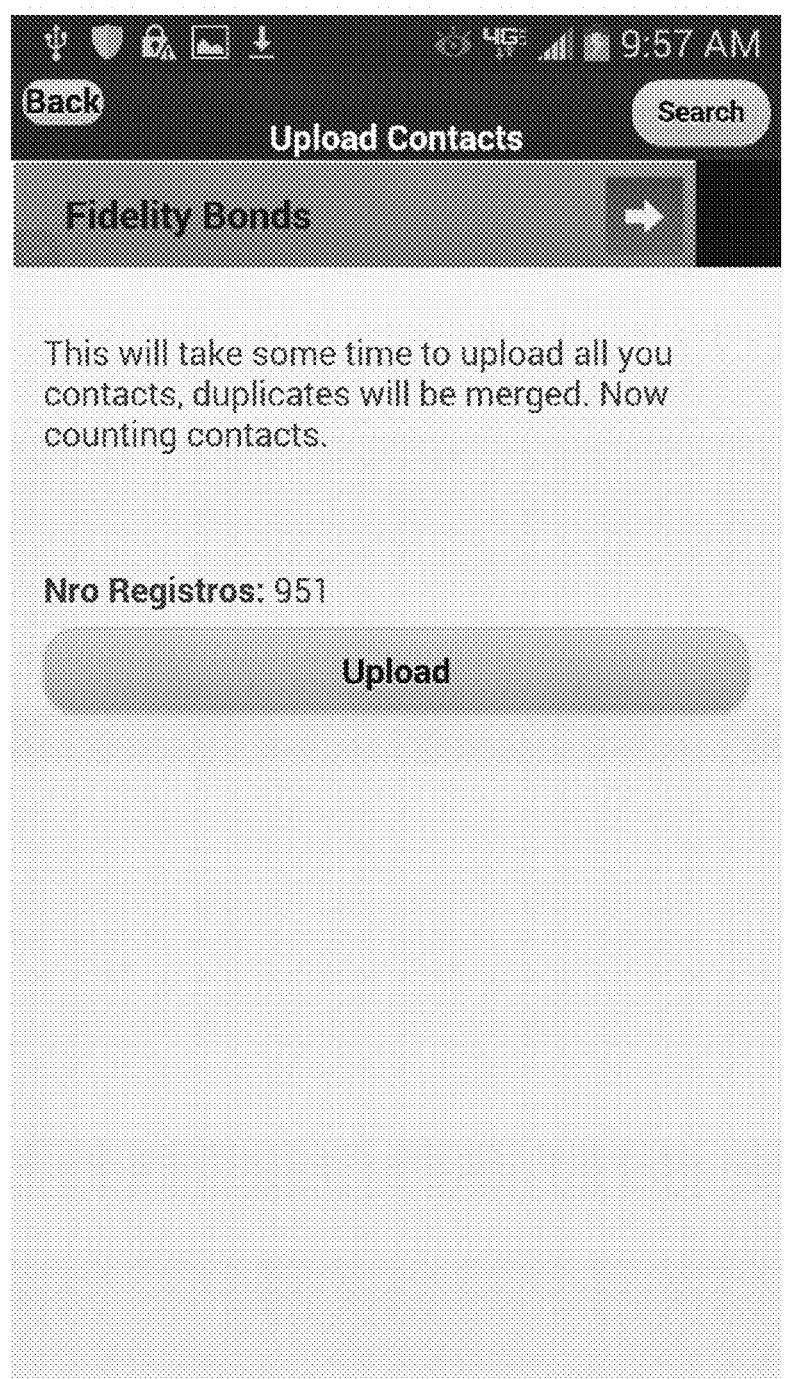
FIG. 5 is a screenshot prior to uploading contacts to a software application, but after counting the number of contacts, according to an embodiment of the current invention.
Figure 6:
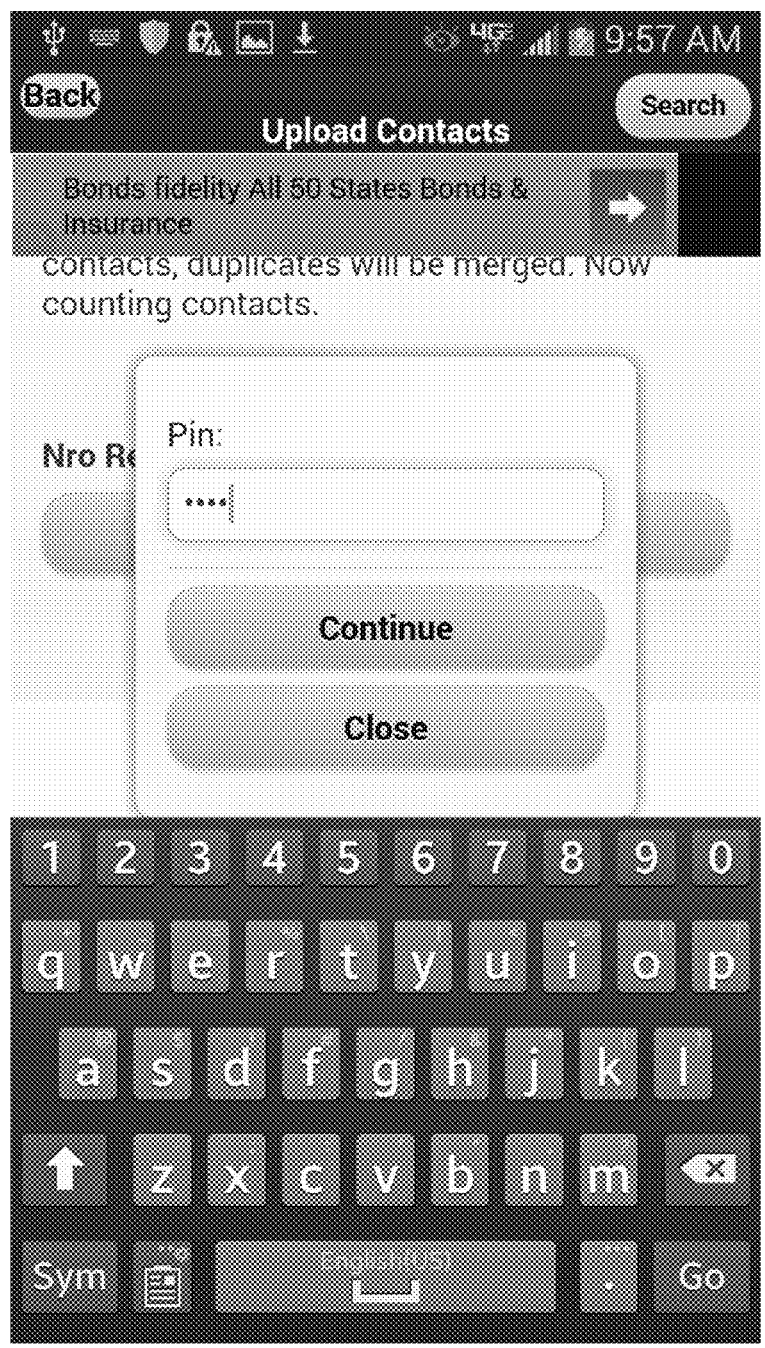
FIG. 6 is a screenshot of a page for an end-user to enter a created personal identification number prior to uploading contacts to a software application according to an embodiment of the current invention.
Figure 7:
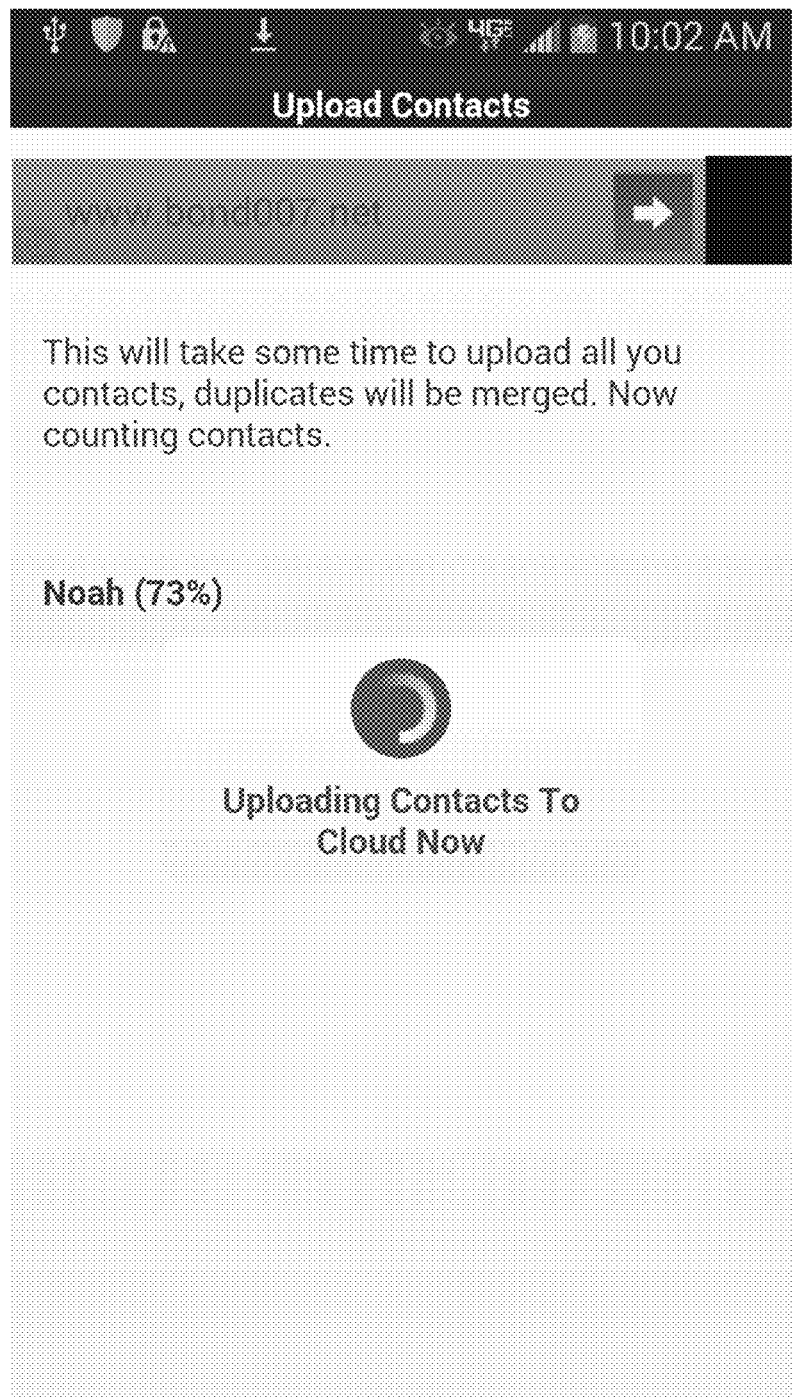
FIG. 7 is a screenshot during uploading of the contacts according to an embodiment of the current invention.
Figure 8:
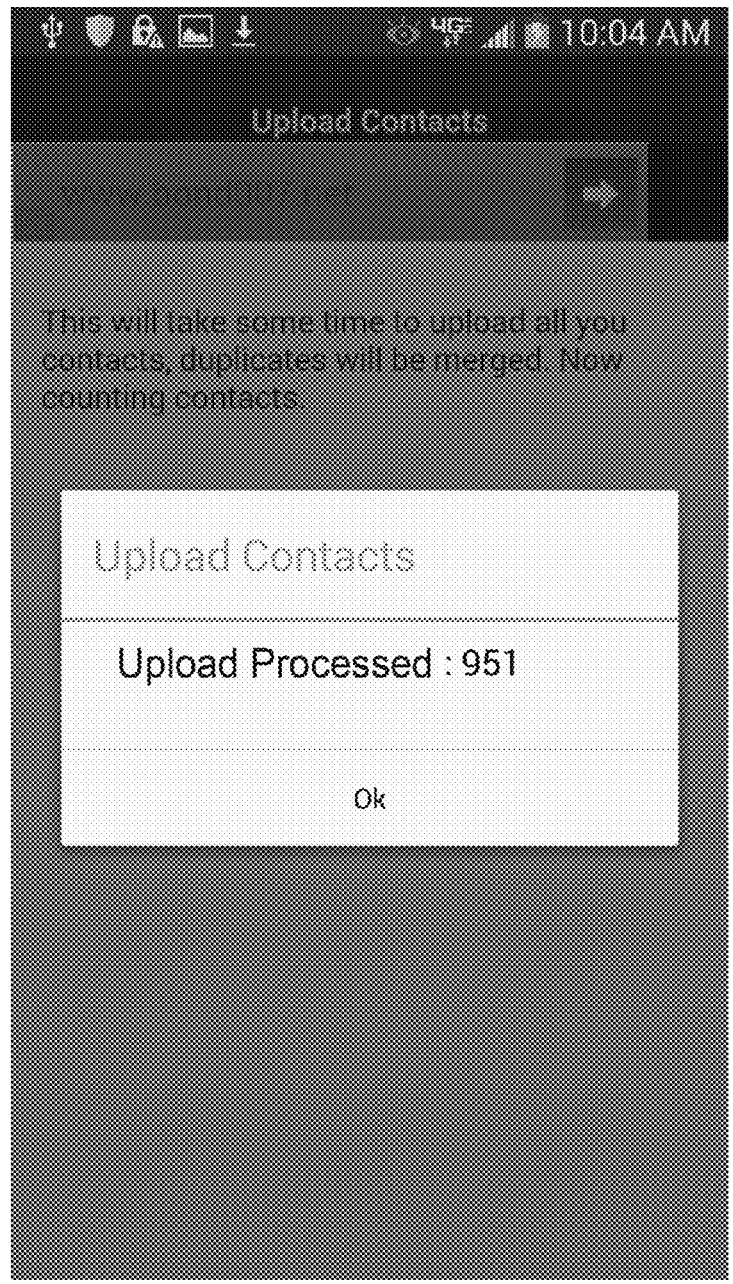
FIG. 8 is a screenshot after uploading contacts to a software application according to an embodiment of the current invention.
Figure 9:
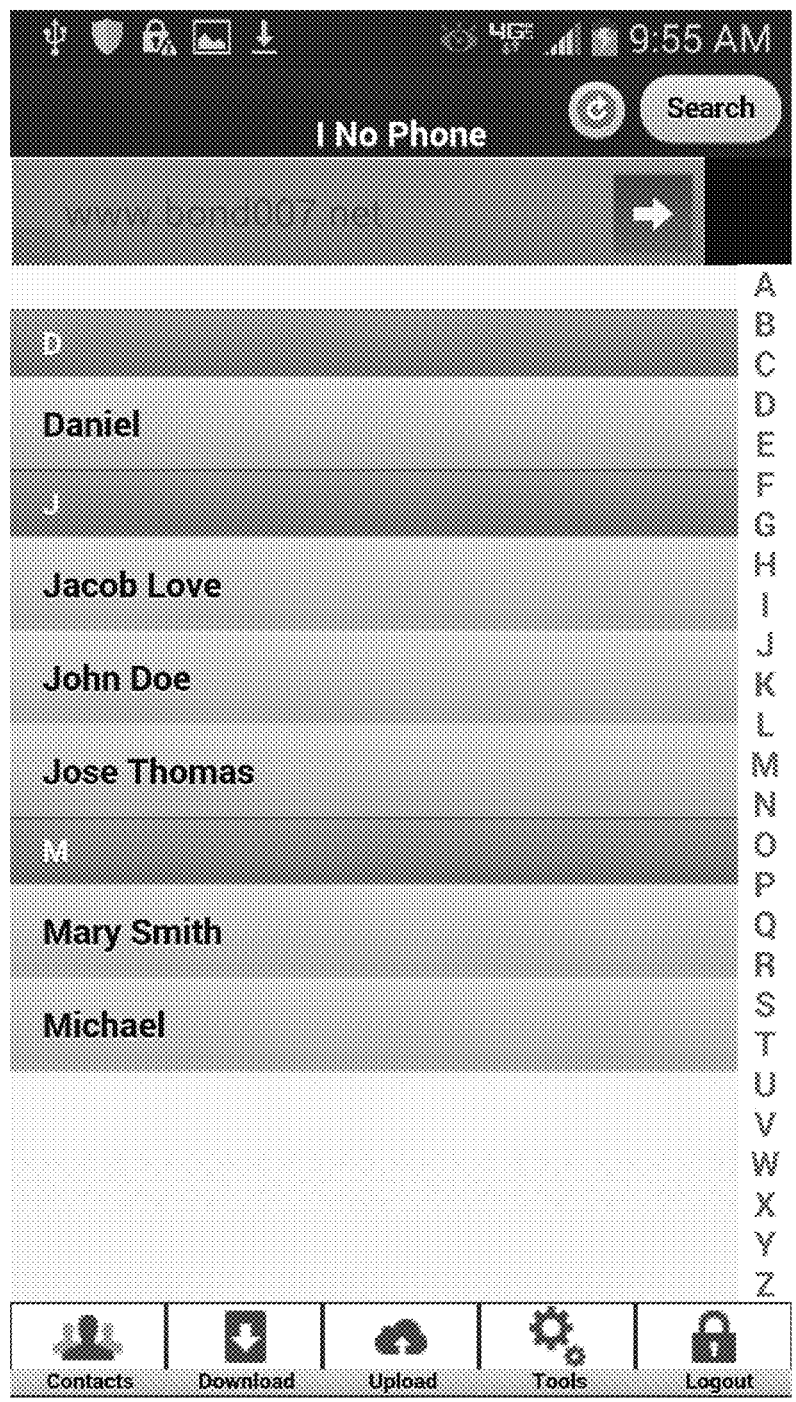
FIG. 9 is a screenshot of a contact list after uploading contacts to a software application according to an embodiment of the current invention.
Figure 10:
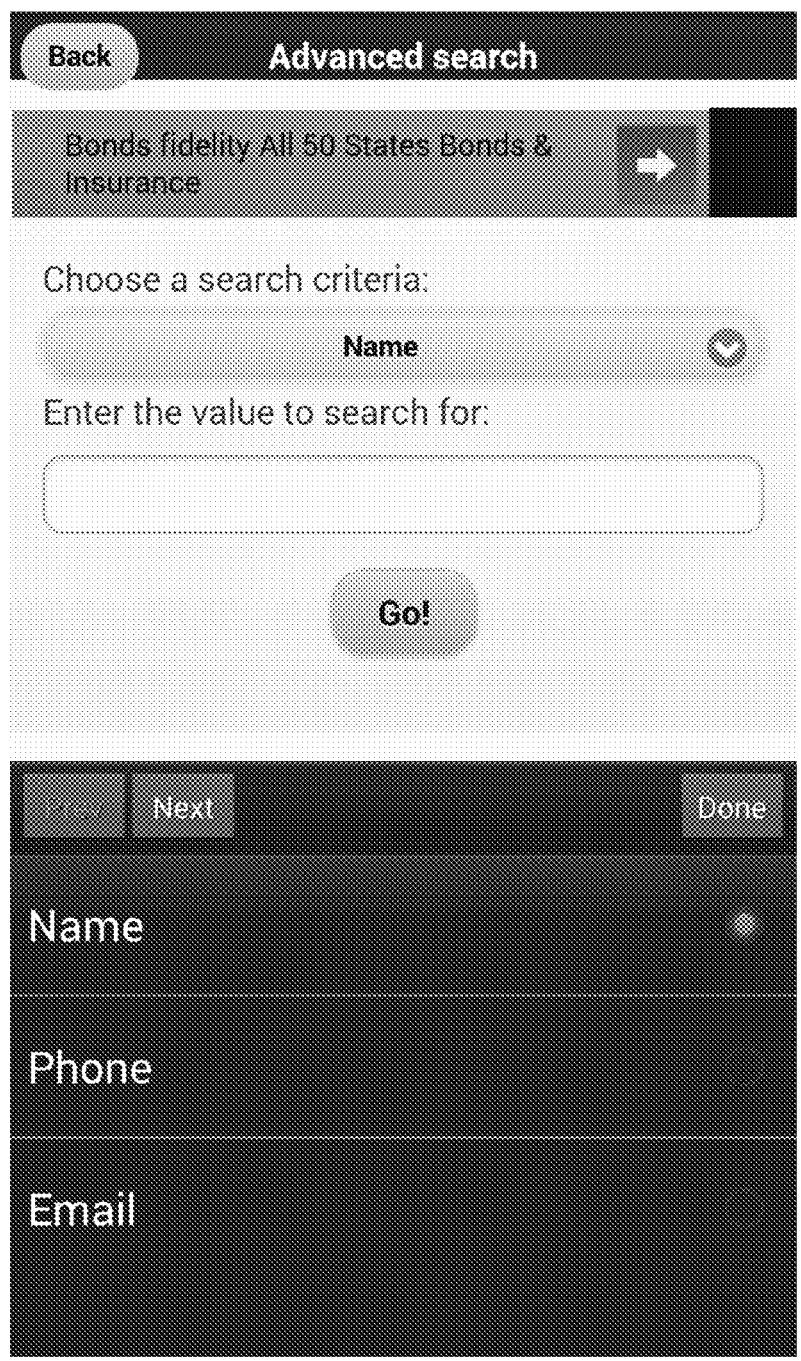
FIG. 10 is a screenshot of a search page for a contact base on different contact information.
Figure 11:
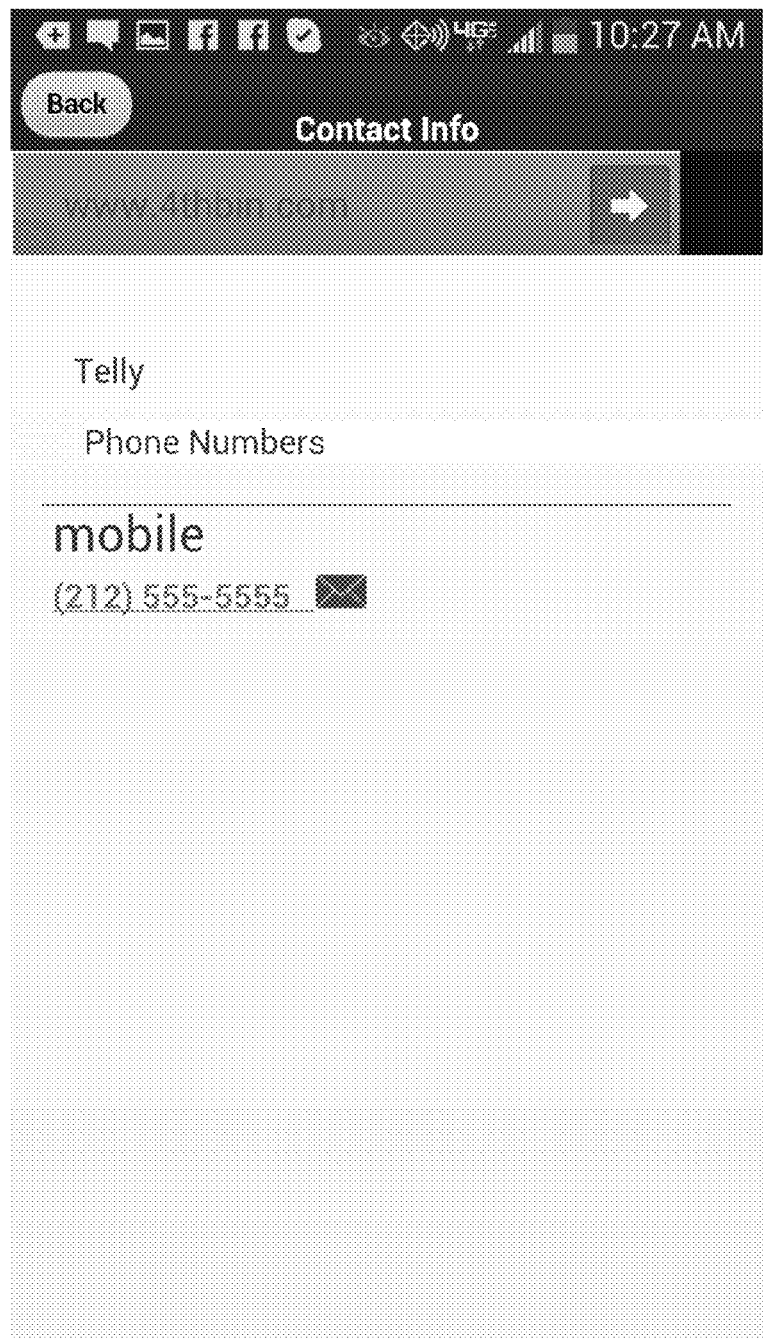
FIG. 11 is a screenshot showing specific contact information of a particular contact from the contact list uploaded to a software application according to an embodiment of the current invention.

When the user-specific contact list is being uploaded, the application counts the number of contacts in the contact list (FIG. 5). When the user inputs the correct PIN (FIG. 6), the application is authorized to begin uploading the contacts from the user-operated mobile device. The application can provide progression identifiers during upload (FIG. 7). When the application completes uploading the contacts (FIG. 8), the application returns to the contact list display, though instead of being blank as before, the contact list is loaded with the user's contacts (FIG. 9). The contacts in this list can be searched by name, phone number, email address, and/or other contact information (FIG. 10). Specific details of a particular can also be displayed, as in FIG. 11.

The user can also access a series of settings, for example changing the user's PIN or changing language used in the application (Spanish, English, French, Italian, Greek. Chinese, Dutch, etc.).

Figure 16:
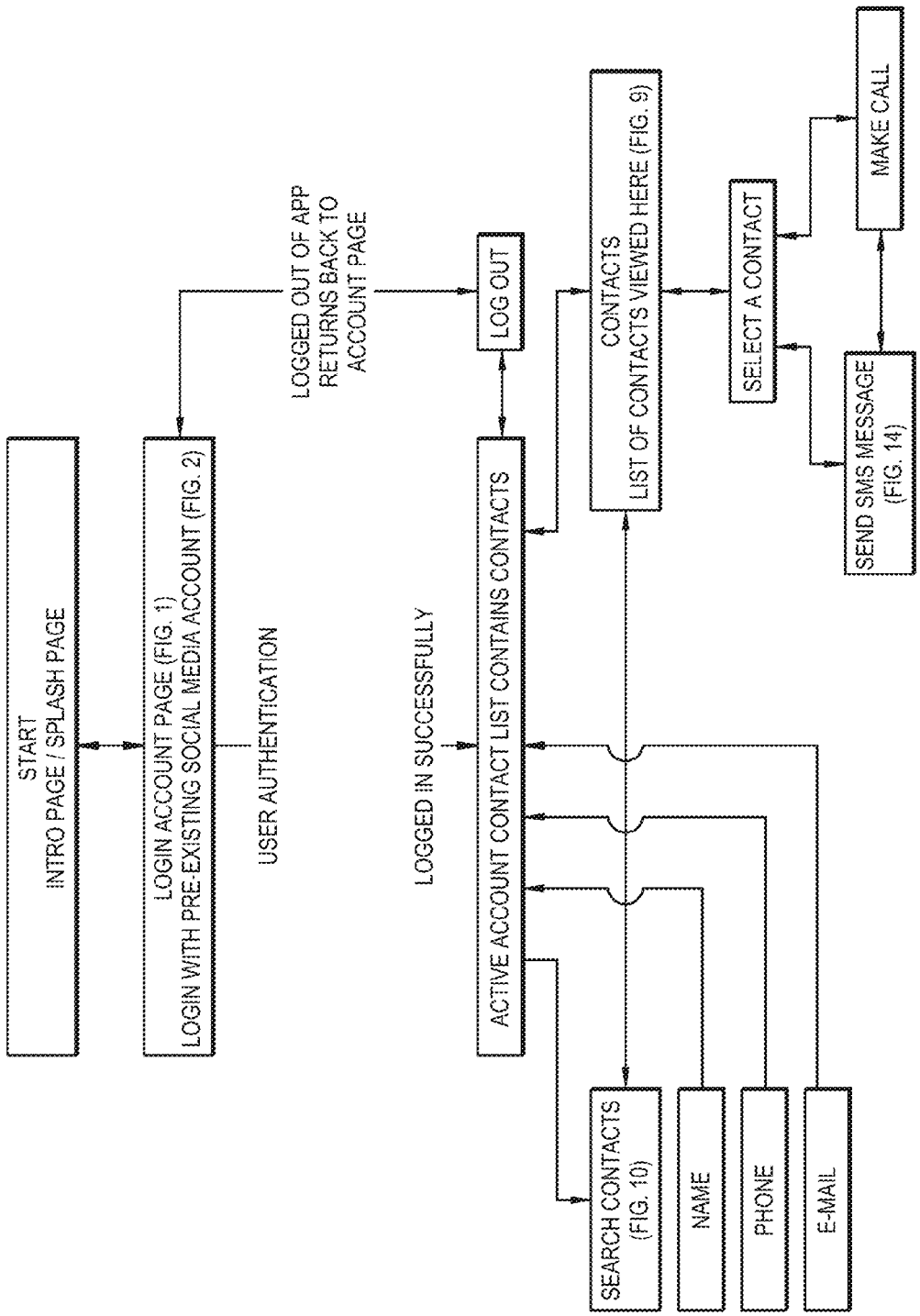
FIG. 16 is a step-by-step flowchart of an end-user's subsequent launch of a software application according to an embodiment of the current invention on a user-operated mobile device.

Use of Application on User-Operated Mobile Device (FIG. 16)

Upon launching the application after the user-specific contact list has been uploaded to the application on the user-operated mobile device, an introductory page or splash screen would be displayed, followed by a login page (FIG. 1) being presented to the user, where the user would log into the application using the created account or social media login, as per the setup of the initial launch of the application.

Once logged in or otherwise authenticated, the user is displayed the user-specific contact list (FIG. 9) since the user account is now an active account and the contact list was previously uploaded.

Figure 12:
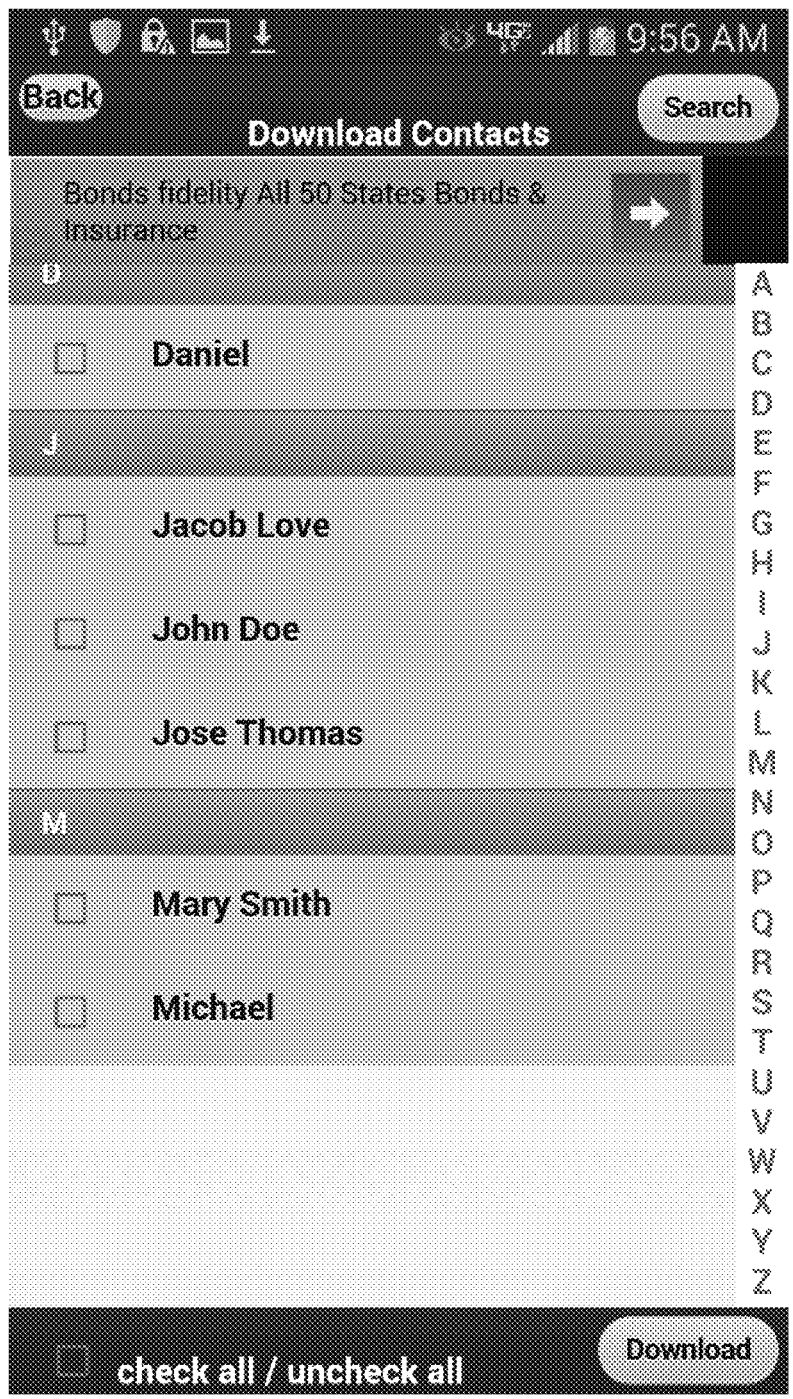
FIG. 12 is a screenshot prior to downloading contacts to an end-user's mobile device from a software application according to an embodiment of the current invention.

An option for the user, at this point, is to download the user-specific contact list from the application to the phone, if needed (FIG. 12). The user may be required to enter the user's PIN to authenticate the download in order to prevent any accidental transfers of contacts. After the download has been completed (FIG. 13), the user-specific contact list is available on the native contact applications of the user-operated mobile device. The display of the application can then return to the contact list display loaded with the user's contacts (FIG. 9)

This feature of the application can be utilized to transfer contacts from the application into the user-operated mobile device, for example if particular contacts are accidentally deleted from the user-operated mobile device. In that case, an entire contact list or certain selective portions (particular contacts) thereof can be downloaded to the mobile device. This feature can also be used on a third party-operated mobile device, as will become clearer as this specification continues.

Figure 17:
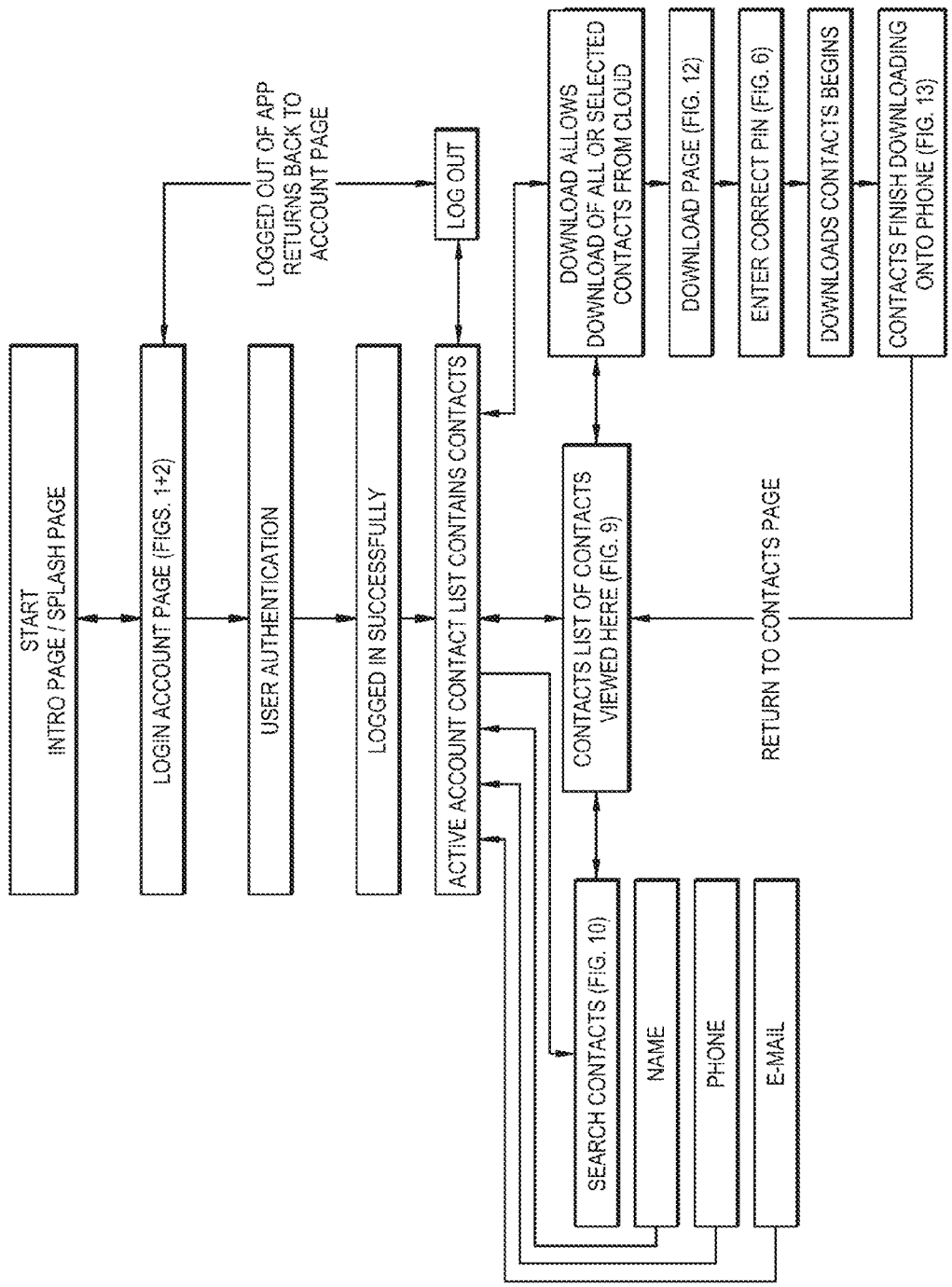
FIG. 17 is a step-by-step flowchart of an end-user's launch of a software application according to an embodiment of the current invention on a third party-operated mobile device.

Use of Application on TP-Operated Mobile Device (FIG. 17)

Upon launching the application on the third party-operated mobile device (after the user-specific contact list was uploaded to the application on the user-operated mobile device), an introductory page or splash screen would be displayed, followed by a login page (FIG. 1) being presented to the user, where the user would log into the application using the created account or social media login, as per the setup of the initial launch of the application on the user-operated mobile device.

If this is the initial launch of the application on the third party-operated mobile device, then the third party user operating the third party-operated mobile device may need to set up the application as the original user had performed in the initial launch of the application on the user-operated mobile device. More specifically, an introductory page or splash screen would be displayed, followed by a language selection page and terms of services agreement. When the terms of services are accepted, a login page (similar to that seen in FIG. 1) is presented to the third party user, where the third party user can use a native application account (name, username, password, email address with account creation confirmation, etc.) or any social media account (e.g., FACEBOOK, LINKEDIN, GOOGLE (FIG. 2), etc.) to log into the application.

Because this is an initial launch of the application on the third party-operated mobile device, the third party user would create and enter a PIN (FIG. 3) that can include any number of alphanumeric characters and special symbols. The PIN prevents accidental uploads and downloads of contact lists or any portion thereof. In an alternative embodiment, the third party user may not need to create a PIN during this setup.

Alternatively, it is envisioned that the third party user is not required to set up the application at all on initial launch, in order for the original user to access the user-specific contact list on the third party-operated mobile device. As long as the application is installed on the third party-operated mobile device, it is envisioned that the original user can log in or otherwise be authenticated on the application or on an associated website to access that user's own contact list.

Regardless, once the original user is logged in or otherwise authenticated on the application installed on the third party-operated mobile device, the user is displayed the user-specific contact list (FIG. 9) since the user account is now an active account and the contact list was previously uploaded to the user's account on the application installed on the user-operated mobile device.

Figure 14:
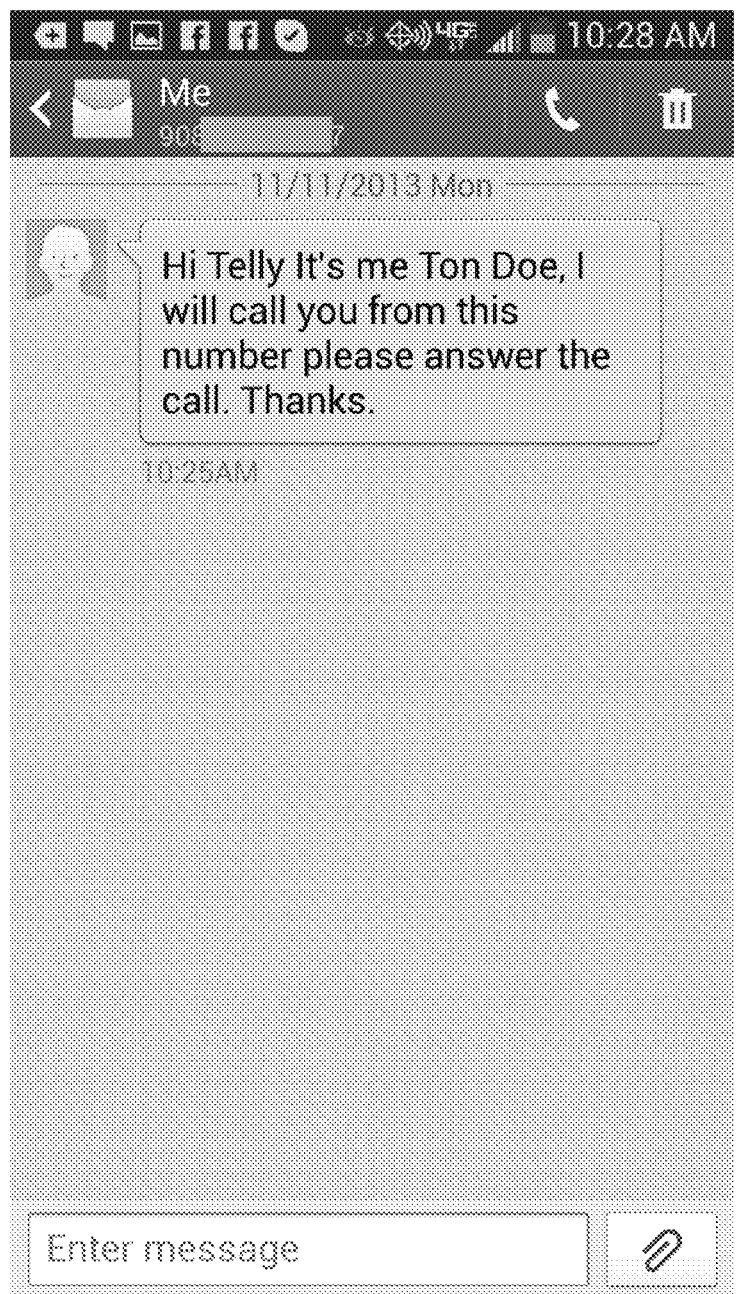
FIG. 14 is a screenshot of a notification (here, a text message) sent to a contact by an end-user from a third party-operated mobile device.

At this point, when the user has accessed the user-specific contact list on the third party-operated mobile device, the user has a variety of options depending on needs of the user. One option is for the user to transmit a notification to a particular contact from the application on the third party-operated mobile (FIG. 14). This notification can have any form, for example a text message, a picture message, a video message, a voice message, a native notification originating from the application itself, etc. This notification is customizable by the user, though the notification can have a default message set by the application itself or by the user of the application.

The following example can illustrate the purpose of this notification. If a user loses, misplaces, or forgets his/her mobile device (user-operated mobile device), the user may still need make a phone call to or otherwise communicated with a particular contact whose phone number has not been memorized by the user. The user can use a friend's mobile device (third party-operated mobile device) and access the user-specific contact list by logging into the user's account on the friend's mobile device. The user can then transmit a notification (e.g., text message) to a particular contact from the user-specific contact list to notify that particular contact that the user will be calling that contact from a phone number associated with the friend's mobile device (third party-operated mobile device). Upon receiving this notification, the particular contact knows to answer a telephone call from a phone number associated with the friend's mobile device, as it will be the user attempting to call that contact. Alternatively, the user can transmit a notification (e.g., SMS message) to the particular contact by simply inputting a message that the user wishes to transmit to the contact (e.g., that the user would be late arriving to meet the contact, etc.). In other words, the user can customize the notification transmitted to the contact.

Figure 13:
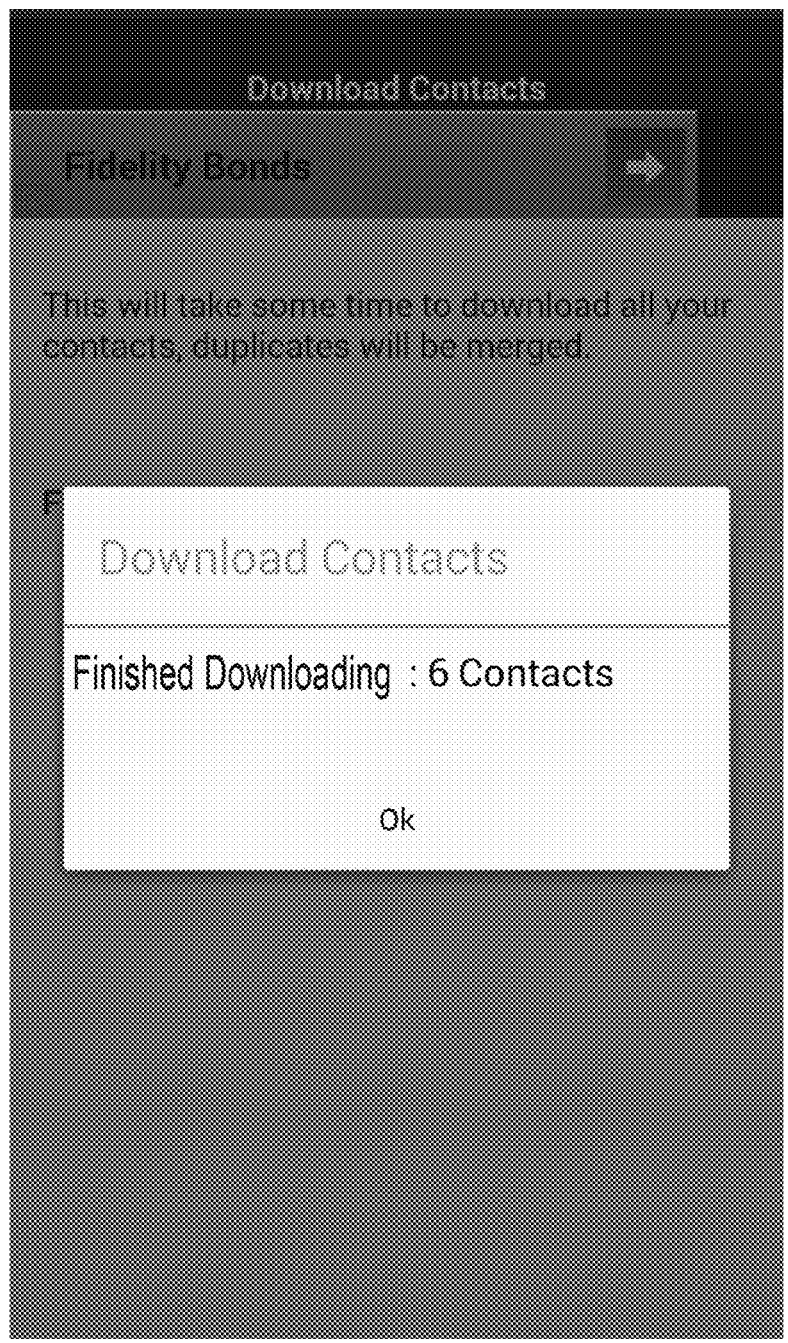
FIG. 13 is a screenshot after downloading contacts to an end-user's mobile device from a software application according to an embodiment of the current invention.

When a user has accessed the user-specific contact list from a third party-operated mobile device, the user also has the option of downloading one or more contacts from the contact list to the third party-operated mobile device (FIGS. 12-13). This action may be desired if the third party wishes to have the contact information of one or more contacts on the user's contact list transferred to the third party's own contact list. After the transfer, the transferred contacts would be available on the native contacts application on the third party-operated mobile device and also automatically synchronized with the current application's contact list.

When a user has accessed the user-specific contact list from a third party-operated mobile device, the user can log out of the user's account. Thus, when logged out, no one has access to the user-specific contact list on the third party-operated mobile device anymore. The user remains secure from any third party accessing the user-specific contact list.

Exemplary Application

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program PIN embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program PIN embodied on a computer readable medium may be transmitted using any appropriate medium, including but not limited to wireless, wire-line, optical fiber cable, radio frequency, etc., or any suitable combination of the foregoing. Computer program PIN for carrying out operations for aspects of the present invention may be written in any combination of one or more programming languages, including an object oriented programming language such as Java, JavaScript, Objective-C, C#, C++ or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, website, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Glossary of Claim Terms

Authentication module: This term is used herein to refer to a section of a program or code that implements a task of permitting access to a computer-based entity, such as a contact list, upon receiving an accurate authentication profile.

Contact database: This term is used herein to refer to an organized collection of data relating to contact information of a grouping of one or more individuals or entities with whom/which a mobile device user may wish to communicate.

Contact database access module: This term is used herein to refer to a section of a program or code that implements a task of reading data in the contact database.

Contact information: This term is used herein to refer to any data related to an individual or entity with whom/which a mobile device user may wish to communicate. Examples include, but are not limited to, name, phone number, email address, eye color, web address, and any other identification or information relating to a contact as may be known in the art.

Contact list: This term is used herein to refer to a grouping of one or more individuals or entities with whom/which a mobile device user may wish to communicate.

Dialing module: This term is used herein to refer to a section of a program or code that implements a task of making a phone call to a contact.

Ephemeral, transitory storage: This term is used herein to refer to a temporary storage entity storing data that can be accessed by a computer-program product or application on a mobile device without having to download said data to the mobile device.

Mobile device: This term is used herein to refer to any electronic apparatus that can be used to contact another individual or entity. Examples include, but are not limited to, cellular phones such as smartphones, tablets, pocket computers, personal computers, and personal digital assistants. When considering two (2) distinct mobile devices, each mobile device can belong to one user, or alternatively to a user and a third party, where the third party has provided authorization or permission to the user to use the third party's mobile device.

Personal identification number: This term is used herein to refer to a unique password shared between a user and a system and is linked to the user's contact list, to the user's authentication profile, and/or to the mobile device.

Preemptive notification module: This term is used herein to refer to a section of a program or code that implements a task of transmitting a notification to another mobile device or application, where the notification notifies the user of the other mobile device or application of a message transmitted from a phone number linked to the originating mobile device.

Remote access module: This term is used herein to refer to a section of a program or code that implements a connection to a data-processing system from a distinct or remote location.

Remote storage archive: This term is used herein to refer to a storage entity for data that may not be actively needed but is maintained for future use or record-keeping. A restore process can retrieve data from the remote storage archive.

Software application: This term is used herein to refer to a computer-program product including a non-transitory, tangible, computer-readable/usable medium that has computer-readable program code embodied therein. The computer-readable program code includes computer-executable instructions for performing or implementing a method of sharing contact information between two (2) or more mobile devices. This method is accomplished by running the computer-program product on a computer that operates under an operating system.

Synchronization module: This term is used herein to refer to a section of a program or code that implements a task of synchronizing data between two (2) more computer-readable entities, for example between a storage entity on a mobile device and a remote storage entity.

Telephone module: This term is used herein to refer to a section of a program or code that implements a task of performing telephony functions.

Telephony functions: This term is used herein to refer to typical operations associated with mobile devices or telephones. Examples include, but are not limited to, voice calls, notifications, text messages, voice messages, voicemail, picture messages, video messages, call logging, call redirection, conference calls, and call restrictions.

Unique user authentication profile: This term is used herein to refer to any data or information that identifies a user. Examples include, but are not limited to, usernames, passwords, email addresses, phone numbers, fingerprints and other biometrics, and other unique identifying information.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A system for sharing contact information between a first mobile device and a second mobile device, comprising:
    a downloadable software application installable on a first mobile device, said first mobile device having a contact database accessible by third party applications;
    a contact database access module providing read access to said contact database by said software application whereby at least a portion of said contact database is extracted to a contact list;
    a unique user authentication profile generated by said software application and linked with said contact list extracted from said contact database;
    a synchronization module coupled to said software application, said synchronization module synchronizing said contact list to a remote storage archive;
    an authentication module communicatively coupled to said remote storage archive, said authentication module allowing access to said contact list responsive to receiving said user authentication profile;
    a second mobile device having said software application installed thereon, said software application communicatively coupled to telephony functions of said second mobile device, whereby outbound telephone calls are initiated directly from said software application;
    a remote access module on said second mobile device, said remote access module sending said user authentication profile to said authentication module to access said contact list on said remote storage archive; and
    a dialing module on said software application initiating an outbound telephone call to an individual contact in said contact list retrieved from said remote storage archive by said remote access module, said outbound telephone calls initiated from said second mobile device.

2. A system as in claim 1, further comprising:
said remote storage archive providing ephemeral, transitory storage of said contact information in said contact list for remote access by said remote access module on said second mobile device.

3. A system as in claim 1, further comprising:
a preemptive notification module on said second mobile device, said preemptive notification module transmitting a notification to a contact from said contact list.

4. A system as in claim 1, further comprising:
said synchronization module synchronizing said contact list and said user authentication profile to said remote storage archive responsive to a personal identification number being generated and linked to said contact list and to said user authentication profile.

5. A system as in claim 1, further comprising:
said second mobile device downloading a selected contact from said contact list on said remote storage archive.

6. A system as in claim 5, further comprising:
said second mobile device downloading said selected contact from said contact list on said remote storage archive responsive to a personal identification number being generated and linked to said contact list and to said user authentication profile.

7. A system as in claim 1, further comprising:
a personal identification number generated and linked to said contact list and to said user authentication profile after said software application on said second mobile device receives said user authentication profile accessing said contact list on said remote storage archive.

8. A computer-implemented method for sharing contact information between a first mobile device and a second mobile device, comprising the steps of:
installing a downloadable software application on a first mobile device, said first mobile device having a contact database accessible by third party applications;
implementing a contact database access module that provides read access to said contact database by said software application whereby at least a portion of said contact database is extracted to a contact list;
generating a unique user authentication profile, said unique user authentication profile generated by said software application and linked with said contact list extracted from said contact database;
coupling a synchronization module to said software application, said synchronization module synchronizing said contact list to a remote storage archive;
communicatively coupling an authentication module to said remote storage archive, said authentication module allowing access to said contact list responsive to receiving said user authentication profile;
installing said software application on a second mobile device, said software application communicatively coupled to telephony functions of said second mobile device, whereby outbound telephone calls are initiated directly from said software application;
providing a remote access module on said second mobile device, said remote access module sending said user authentication profile to said authentication module to access said contact list on said remote storage archive; and
providing a dialing module on said software application initiating an outbound telephone call to an individual contact in said contact list retrieved from said remote storage archive by said remote access module, said outbound telephone calls initiated from said second mobile device.

9. A computer-implemented method as in claim 8, further comprising:
said remote storage archive providing ephemeral, transitory storage of said contact information in said contact list for remote access by said remote access module on said second mobile device.

10. A computer-implemented method as in claim 8, further comprising:
providing a preemptive notification module on said second mobile device, said preemptive notification module transmitting a notification to a contact from said contact list.

11. A computer-implemented method as in claim 8, further comprising:
said synchronization module synchronizing said contact list and said user authentication profile to said remote storage archive responsive to a personal identification number being generated and linked to said contact list and to said user authentication profile.

12. A computer-implemented method as in claim 8, further comprising:
said second mobile device downloading a selected contact from said contact list on said remote storage archive.

13. A computer-implemented method as in claim 12, further comprising:
said second mobile device downloading said selected contact from said contact list on said remote storage archive responsive to a personal identification number being generated and linked to said contact list and to said user authentication profile.

14. A computer-implemented method as in claim 8, further comprising:
generating a personal identification number linked to said contact list and to said user authentication profile after said software application on said second mobile device receives said user authentication profile accessing said contact list on said remote storage archive.

15. A system for sharing contact information between a first mobile device and a second mobile device, comprising:
a downloadable software application installable on a first mobile device, said first mobile device having a contact database accessible by third party applications;
a contact database access module providing read access to said contact database by said software application whereby at least a portion of said contact database is extracted to a contact list;
a unique user authentication profile generated by said software application and linked with said contact list extracted from said contact database;
a synchronization module coupled to said software application, said synchronization module synchronizing said contact list to a remote storage archive;
an authentication module communicatively coupled to said remote storage archive, said authentication module allowing access to said contact list responsive to receiving said user authentication profile;
a second mobile device having said software application installed thereon, said software application communicatively coupled to telephony functions of said second mobile device, whereby outbound telephone calls are initiated directly from said software application;
a remote access module on said second mobile device, said remote access module sending said user authentication profile to said authentication module to access said contact list on said remote storage archive; and
a dialing module on said software application initiating an outbound telephone call to an individual contact in said contact list retrieved from said remote storage archive by said remote access module, said outbound telephone calls initiated from said second mobile device;

wherein said remote storage archive provides ephemeral, transitory storage of contact information in said contact list for remote access by said software application on said second mobile device; and a preemptive notification module on said second mobile device, said preemptive notification module transmitting a notification to a contact from said contact list that said voice call is being made to said contact from a phone number associated with said second mobile device, said second mobile device downloading a selected contact from said contact list on said remote storage archive.

* * * * *